May 1, 1951     O. W. ROOSEVELT     2,551,396
POWER DIVERSION TRANSMISSION
Filed Jan. 20, 1945     3 Sheets-Sheet 1

INVENTOR
Oliver W. Roosevelt
BY
Arthur Wright
ATTORNEY

May 1, 1951 — O. W. ROOSEVELT — 2,551,396
POWER DIVERSION TRANSMISSION
Filed Jan. 20, 1945 — 3 Sheets-Sheet 2
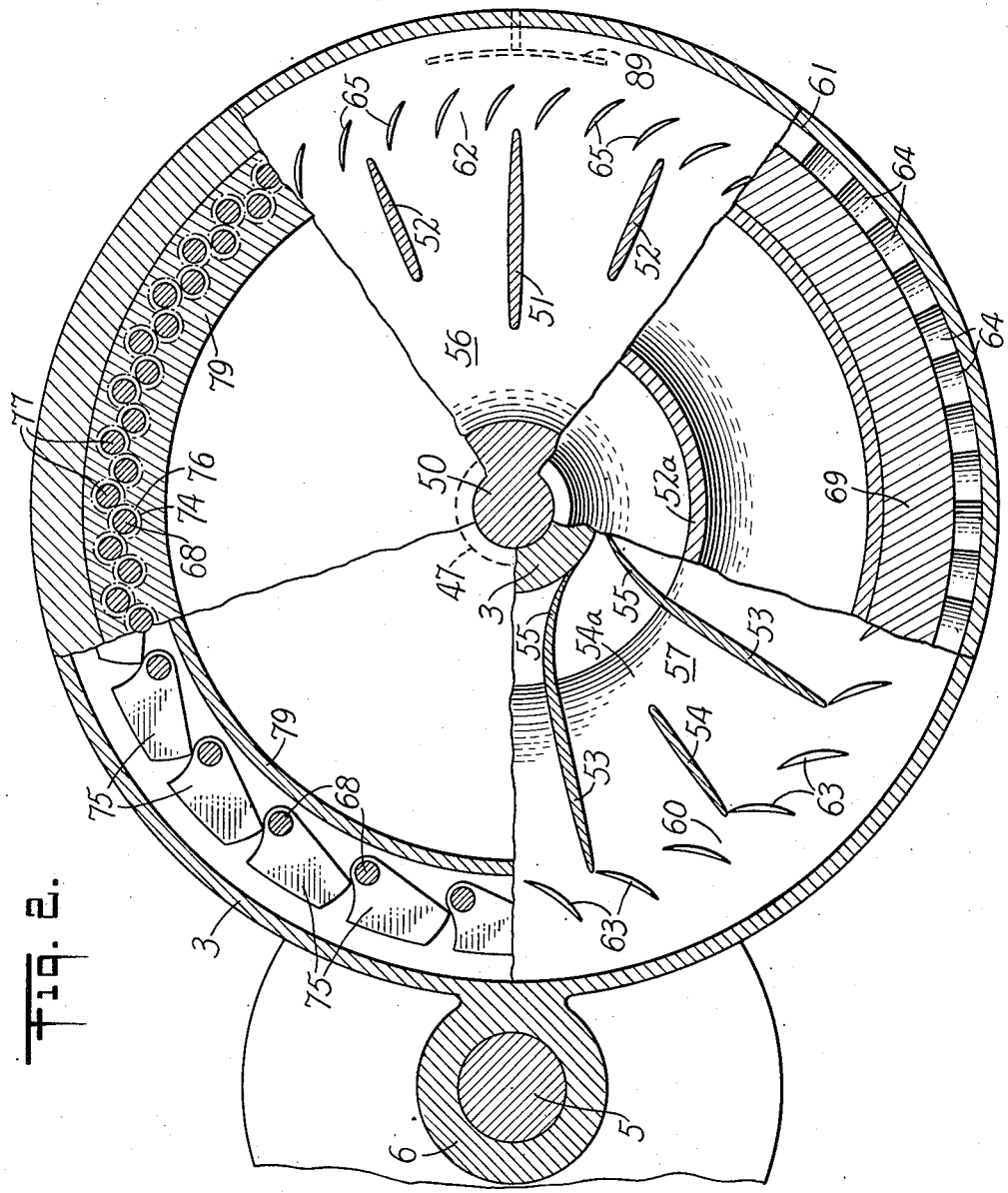
INVENTOR
Oliver W. Roosevelt
BY
Arthur Wright
ATTORNEY May 1, 1951     O. W. ROOSEVELT     2,551,396
POWER DIVERSION TRANSMISSION Filed Jan. 20, 1945     3 Sheets-Sheet 3

INVENTOR
Oliver W. Roosevelt
BY
Arthur Wright
ATTORNEY

UNITED STATES PATENT OFFICE 2,551,396

POWER DIVERSION TRANSMISSION

Oliver W. Roosevelt, New York, N. Y.

Application January 20, 1945, Serial No. 573,740

6 Claims. (Cl. 74—688)

My invention relates particularly to power diversion transmissions adapted to be applied in the transmission of power by a motor in any desired type of apparatus, although it has special applicability to the operation of automotive vehicles, as for example taxicabs, buses, trucks, rail cars and locomotives.

The object of my invention is to provide a transmission by means of which varying gear ratios may be obtained according to the load. Another object is to provide virtually universal gear ratios permitting shock-free acceleration. Another object is to provide means for starting a motor vehicle using the minimum required engine power under any conditions of road or grade. Another object is to eliminate unnecessary engine strains due to forcing the operation of the motor at too low a gear ratio. Still another object is to eliminate shocks and wear, as well as loss in efficiency, when changing the gear ratios. Accordingly, my invention is designed to provide greater operating efficiency and longer life of the engine, chassis, body and tires of automobiles. This is of great importance, especially in connection with the operation of taxicabs, buses, light and heavy trucks, etc. Still another object is to provide means for altering or automatically changing the gear ratios and, when desired, to eliminate the automatic gear ratio changing mechanism and provide a direct drive. Further objects of my invention will appear from the detailed description of the same hereinafter.

While my invention is capable of embodiment in many different forms, for the purpose of illustration I have shown only one form thereof in the accompanying drawings, in which:

Fig. 2 is a transverse section of the same taken on several different planes;

Fig. 3 is a vertical section of the same showing a part of the runner;

Figure 1:
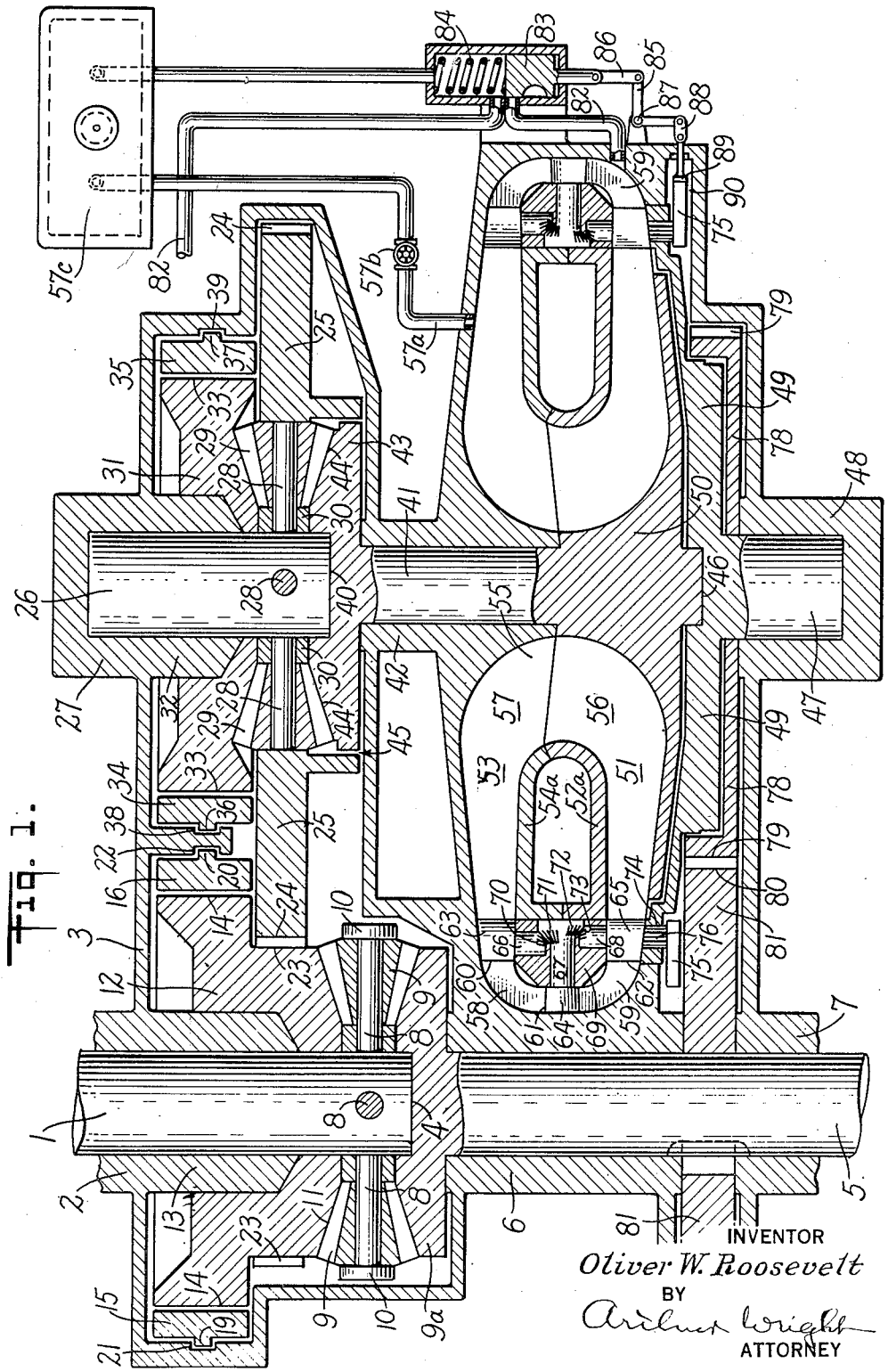
Fig. 1 is a diagrammatic plan view of a power diversion transmission made in accordance with my invention.
Figure 4:
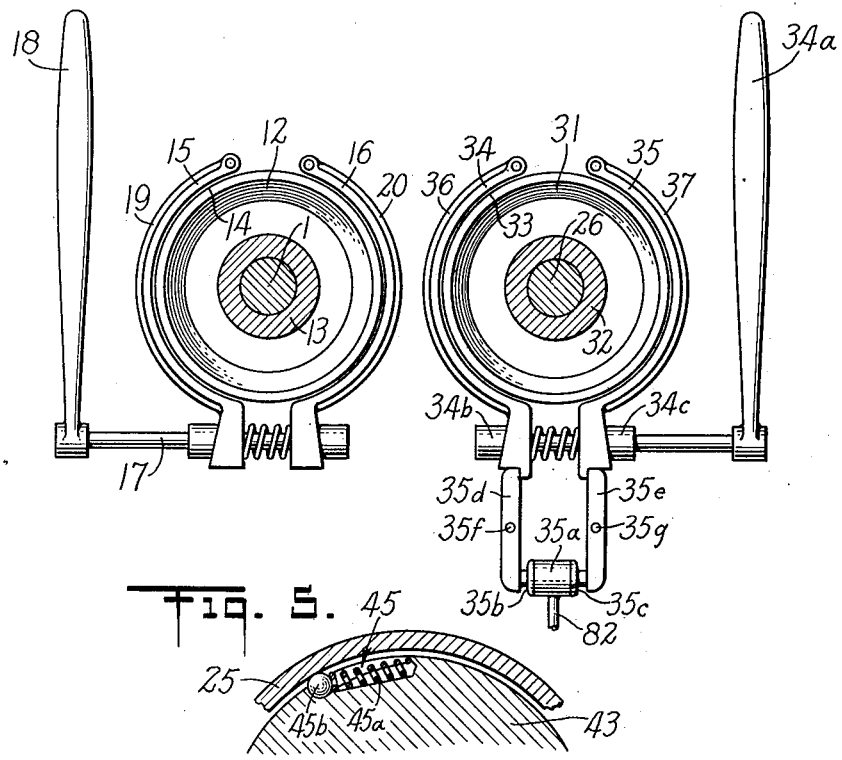
Fig. 4 is an elevation of the clutch shoes and operating levers forming a part of the gear ratio changing transmission.
Figure 5:
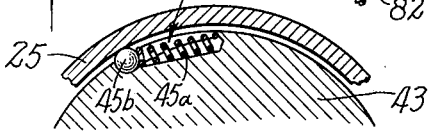
Fig. 5 is a vertical section of one of the free wheeling or ratchet devices used in connection with my invention.

In the drawings I have shown a driving shaft 1 which may be connected to or form a part of any desired motor, as for example an internal combustion motor, mounted on a vehicle, such for instance as a taxicab or bus, the same being carried in any suitable bearings 2 forming part of a transmission housing 3. The inner end of the shaft 1 is also supported for relative rotation in a recess 4 in a driven shaft 5, the said shaft 5 being connected to drive the vehicle by the usual manually operated synchro-mesh gear engagement for direct drive, plus a reverse gear, and universal joint (not shown) which may be constructed in the usual manner. The shaft 5 is carried in bearings 6 and 7 forming a part of the transmission housing 3. On the shaft 1, furthermore, there are mounted, for rotation therewith, a plurality of radial shafts 8, each of which carries a conical satellite gear 9 spaced away from the shaft, and which is maintained in place by a disk member 10 secured to the shaft 8. The conical satellite gears 9 on one side mesh with a gear face 11 of an annular power-diversion gear 12 rotatable on the shaft 1 and which is supported by bearing 13 forming a part of the transmission housing 3, and on the other side mesh with a gear 9a fast on the shaft 5. The said gear 12, furthermore, has a cylindrical periphery 14 acting as a friction brake, with pivoted brake shoes 15 and 16, the lower ends of which can be forced together by means of a rotatable cam shaft 17, or any other usual means, operated by a hand lever 18. It will be noted that the brake shoes 15 and 16 have guide ribs 19 and 20, respectively, which cooperate, respectively, with recesses 21 and 22 carried by the walls of the transmission housing 3.

The gear 12, furthermore, has a gear face 23 which meshes with a gear face 24 of a gear 25 tightly secured to a shaft 26 carried by bearings 27 in the housing 3, the said gear 25 being connected by means of a series of subsidiary gear shafts 28 to said shaft 26. The said subsidiary gear shafts 28, furthermore, carry conical gears 29 thereon which are spaced away from the shaft 26. The said conical gears 29, also, mesh with an annular floating gear 31 rotatably carried by the shaft 26 and supported in bearing 32 on the said housing 3. The outer periphery of the floating gear 31 has a friction face 33 to cooperate with a pair of pivoted brake shoes 34 and 35, having guide ribs 36 and 37 carried in recesses 38 and 39 in the housing 3. The brake shoes 34 and 35 can be brought into and out of engagement to any desired extent with the friction face 33 by means of a hand lever 34a which operates cams 34b and 34c to bring the brake shoes 34 and 35 together to any desired extent.

However, they may be brought together, also, automatically by a hydraulic cylinder 35a having pistons 35b and 35c bearing on levers 35d and 35e, on fixed pivots 35f and 35g, which bear on the brake shoes 34 and 35.

The said shaft 26, at its inner end, is rotatably carried in a recess 40 in a shaft 41 which is supported in bearing 42 in the said housing. The said shaft 41, furthermore, has a bevelled gear 43 having a gear face 44 meshing with the gears 29. Adjacent to the said gear face 44, the gear 43 is, also, provided with a free wheeling connection 45 with the gear 25 by means of tapered ball recesses 45a having balls 45b therein in the usual way, so arranged that the gear 43 may travel faster than the gear 25, but so that the gear 43 must travel at least as fast as the gear 25.

The inner end of the shaft 41 is rotatably carried in a recess 46 in a shaft 47 supported in bearing 48 in the said housing, to which shaft 47 there is secured a rotatable runner 49. On the periphery of the shaft 41 there is an impeller 50 having a series of impeller blades 51 and 52, all of said blades being arranged radially and connected together by a wall 52a, but the blades 52 being arranged to alternate with the blade 51 and being somewhat shorter than the blades 51, as shown in Fig. 2. The impeller blades 51 and 52 are arranged adjacent to a series of stationary guide blades 53 and 54 carried in a fixed position in the housing 3, which blades 53 and 54 are also arranged radially and are connected together by a wall 54a, the blades 53 having inner curved ends 55 which extend down to a point near the shaft 41. In this way chambers 56 are formed by the blades 51 and 52, which communicate with chambers 57 between the blades 53 and 54 to form a circulation space which may be preliminarily filled with any desired liquid, as for example an oil or hydraulic brake fluid. The chambers 56 and 57 can be kept supplied with this fluid through a pipe 57a, having a normally open petcock 57b, leading from a vented reservoir 57c. The housing 3, furthermore, has two sets of stationary, radially-arranged, guide blades 58 and 59, leaving annular spaces 60, 61 and 62 for three sets of blades 63, 64 and 65, respectively, which are supported by stud shafts 66, 67 and 68 located in a floating ring 69. The shaft 66 has several conical gear teeth 70 which mesh with a similar set of conical gear teeth 71 which are on the shaft 67. Furthermore, on the shaft 67 there are a number of conical gear teeth 72 which will mesh with a similar number of conical gear teeth 73 on the shaft 68. The said shaft 68 is journalled in sockets 74 in the runner 49, and the end of the alternate shaft 68, which extend beyond the runner 49, are each provided with a centrifugal counterweight 75. Also, on each of the shafts 68 there are peripheral gear faces 76 which mesh with intermediate gears 77 located between the respective shafts 68, so that all of said centrifugal counterweights 75 will operate in unison.

Figure 6:
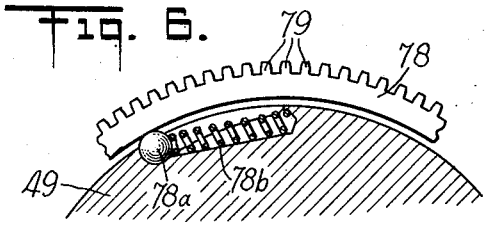
Fig. 6 is a similar section of another free wheeling or ratchet connection in the transmission made in accordance with my invention.

Journalled on the shaft 47, furthermore, there is rotatably carried an annular gear 78, and between the said gear 78 and the periphery of the runner 49 there is arranged a free wheeling connection in the form of a series of balls 78a and tapered sockets 78b, as shown in Fig. 6, so arranged that the gear 78 may rotate faster than the runner 49, but so that the speed of the runner 49 cannot exceed the speed of the gear 78. On its periphery, gear 78 has a gear face 79 which meshes with gear teeth 80 on the periphery of a gear 81 which is keyed to the shaft 5.

Also, the cylinder 35a is connected by a pipe 82 to a space between any two of the blades 59. In circuit with the said pipe 82 there is a plunger valve 83 normally seated in closed position by a spring 84, and which is connected to a bell crank lever 85 by a link 86, said lever 85 having a fixed pivot 87 and a link 88 connected to a plunger 89. The plunger 89 is carried in a chamber 90 adjacent to the counterweights 75, and is long enough, as shown in Fig. 2, to bridge across the outer faces of any two adjacent counterweights 75, so as to overlie simultaneously the outermost positions, when rotating, of at least two of said counterweights.

In the operation of the power diversion transmission made in accordance with my invention, it will be understood that the motor, when operating, will, accordingly, rotate the shaft 1. In starting the vehicle, the brake shoes 15 and 16 will be in released position with regard to the brake surface 14. Also, the brake shoes 34 and 35 will be in released position before the motor is being started. The torque from the shaft 1 is transmitted and to the driven shaft 5 through the satellite gears 9 through the gears 23 and 24 to the shaft 5 owing at least to the restraint exercised by the gearing and the impeller 50. When it is desired to transmit the driving force to the vehicle for moving the same, the synchro-mesh gear for direct drive (not shown) connected to the shaft 5, is thrown into engagement manually. At the idling speeds of the motor, this will tend, already, to produce some forward motion, inasmuch as the satellite gears 9 will be turning the gear 12 at double the number of R. P. M. of the shaft 1, using the gear 9a as a fulcrum. Likewise, as a result of the rotation of the gear 12, the gear 25 and the shaft 41 will revolve, but the gear ratio between the gear 12 and the gear 25 will produce very little power through the torque converter at the idling speeds of the motor. When the motor is accelerated, however, it transmits an effective torque to the shaft 5, through the gear 9a and the runner 49 as well as the gear 78, owing to the force of the circulating liquid in the chamber 56 and 57, which reacts against the fixed guide blades 53, 54, 58 and 59 through the intervention of the movable blades 60, 61 and 62. When the vehicle is adequately in motion to meet the existing conditions, the brake lever 34a is preferably operated to slow down the floating gear 31 to the desired degree, so as to bring it to a stop, thus doubling the speed of the shaft 41 relative to the gear 25. The setting of the brake shoes 34 and 35 can be chosen or predetermined in any desired way, either manually by the lever 34a or so as to bring the brake into action automatically, to the desired extent, by any suitable mechanism, as, for instance, according to the increase of speed of the runner 49, because of the counterweights 75 pushing on the plunger 89 to open the communication of the valve 83 with the pipe 82. Normally, when the mechanism is at rest the counterweights 75 may have been returned to their initial position by the spring 84, but in any event they will be returned by the first flow of the liquid. The greater the speed of the runner 49 the more the valve 83 is opened, and thereby exerting hydraulic pressure to tighten the brake shoes 34, 35. The brake shoes 34 and 35 can be placed in a set position manually so as to retain the gear 31 at rest, under one set of road conditions, or they can be moved into said position automatically by the pressure from the pipe 82. It will be understood that with the increase of speed of the runner 49 the counterweights 75 will be moved outwardly. The brake shoes 34 and 35 can be released by the hand lever 34a before the vehicle is being started again or when unusual grade or other road conditions make it desirable to do so. As the shaft 5 acquires an increasing R. P. M., the counterweights 75 tend to move the movable blades 63, 64 and 65 toward closed positions, so as to increase the R. P. M. of the runner 49 and the shaft 5, or to require relatively fewer R. P. M. of the annular gear 12, thus providing for fewer revolutions of the driving shaft 1 as compared with the driven shaft 5. Also, as the speed of the runner 49 increases the brake shoes 34 and 35 will be tightened hydraulically from the pipe 35b. In this way, each additional acceleration of the motor serves to increase the R. P. M. of the driven shaft 5 as compared with the engine speed, and I have provided, thus, a flexible and constantly variable ratio of engine speed to the speed of the vehicle, varying from a low speed with a high torque to a high speed with a low torque. Under the conditions of operation, furthermore, the gear 12 may revolve more slowly than the driven shaft 5. When this has taken place to a sufficient extent, if desired the brake shoes 15 and 16 may be operated by the hand lever 18 to bring the annular gear 12 to rest, thus producing an over drive. The driven shaft 5 will then be revolving twice as fast as the driving shaft 1.

In the operation, it is to be understood that the motor will preferably revolve in one direction only, which may be called the positive direction. Before starting the motor the brake shoes 15 and 16 will be released with regard to the brake surface 14, the brake shoes 34 and 35 will likewise be in released position, and the synchromesh gear engagement (not shown) for direct drive between the shaft 5 and the shaft to the driven axles will be disengaged. The motor is then started. When it is desired to transmit driving force to move the vehicle the synchromesh gear is manually brought into engagement. The motor at that moment should be idling. Even at idling speeds, once the synchromesh gear is engaged the motor will tend to produce some forward motion of the vehicle for the following reasons: The motor will revolve the shaft 1 in the positive direction. The torque will be exerted in the positive direction through the satellite gear 9 to the gear 9a and thence to the shaft 5. Simultaneously, the satellite gears 9 will revolve the gear 12 in the positive direction. The gear 12 being in mesh with the gear 25, the gear 25 will revolve in the inverse direction, hereinafter referred to as the inverse direction, to the shaft 1. The gear 43 will then likewise revolve in the inverse direction because the free wheeling connection 45 will lock. The gear 43 being fast on the shaft 41, the latter is the driving shaft for any desired torque converter which will convert high speed low torque into low speed high torque, the driven shaft of said torque converter being geared to the shaft 5 so as to impart torque in the positive direction to said shaft 5. The torque converter shown and described is of a centrifugal fluid type with impeller blades and a runner driven in the inverse direction by the force of the fluid against automatically adjustable rotatable blades set in the runner, the said runner having a gear face in mesh with the gear 81, which is fast on the shaft 5, thereby imparting torque in the positive direction to the shaft 5. At idling speeds very little torque tending to produce forward motion will be imparted to the shaft 5 and hence to the vehicle. When the motor is accelerated, however, the R. P. M. of the shaft 41 driving the torque converter will increase, creating the conditions under which a high speed low torque is converted into a high torque imparted to the driven shaft 5 through the gearing which has been described. Simultaneously, since the gear 9a acts as a fulcrum for the diversion of power through the gears 12, 25 and free wheeling device 45 to the shaft 41, torque is likewise imparted through said gear 9a to the shaft 5. Forward motion will, accordingly, take place when the motor has been accelerated sufficiently so that the torque imparted to the shaft 5 through the torque converter as well as through the gear 9a is sufficient to overcome the particular resistance to such forward motion which exists under any given set of road conditions.

Before motion takes place, that is to say before the shaft 5, with the synchromesh gear in mesh, thereby producing drive of the vehicle, begins to revolve, the gear 12 will revolve at twice the R. P. M. of the motor shaft 1. As the shaft 5 starts to revolve and increases its R. P. M., the ratio of R. P. M. of the gear 12 with respect to the shaft 1 becomes reduced yet the number of R. P. M. of the gear 12 can be maintained, reduced, or increased by changing the number of R. P. M. of the motor to meet any attainable speed of the vehicle under the given road conditions.

As the vehicle increases its R. P. M. the R. P. M. of the driven shaft of the torque converter increase to such an extent that it becomes desirable to increase the amount of power imparted to the shaft 5 through the satellite gears 9 and decrease the amount of power imparted to the shaft 5 through the torque converter. This is done by setting the brake shoes 34 and 35 in order to partially or entirely lock the floating gear 31, thereby doubling the R. P. M. of the gear 43 with respect to the gear 25. The resultant increased resistance in the torque converter will increase the load on the motor by increasing the torque imparted to the shaft 5, both through the gear 9a and through the torque converter. If this is done under appropriate road conditions the speed of the vehicle will be increased still further. Two methods are shown for locking the brake shoes 34 and 35, one manually, through the operation of the lever 34a, and the other hydraulically. The hydraulic means involves the use of a hydraulic torque converter such, for instance, as the one shown in which the series of counterweights 75, changing the pitch of the blades 63, 64 and 65 set in the runner, are forced outwardly by centrifugal force as the R. P. M. of the runner 49 increase, thereby tending to close the blades 63, 64 and 65, but which are forced inwardly by the centrifugal force of the liquid which tends to open the blades 63, 64 and 65. When forced outwardly the said blades raise the plunger 89 which in turn, through the linkage 88, 85 and 86, opens the valve 83 and permits fluid under pressure in the chamber 56 to flow through the pipe 82 to the hydraulic cylinder 35a to operate the pistons 35b and 35c therein.

The fluid withdrawn from the chamber 56 is replaced from the reserve tank 57c through the pipe 57a to the chamber 57 where a reduced pressure exists. Likewise, when the valve 83 is closed again the fluid from the cylinder 35a may return to the reserve tank 57c.

Finally, when the brake shoes 34 and 35 have become set, the speed of the vehicle increase still further and the R. P. M. of the gear 9a may exceed the R. P. M. of the gear 12; and, if desired, the brake shoes 15 and 16 may be set manually, thereby creating a 1 for 2 over-drive.

While I have described my invention above in detail it is to be understood that many changes may be made therein without departing from the spirit of the same.

I claim:

1. A power diversion transmission comprising a driving shaft, a driven shaft driven thereby, a satellite gear having its axis secured to the driving shaft, a gear forming a driving connection between the satellite gear and the driven shaft, a diversion gearing in driving relationship between the satellite gear and the driven shaft, and a torque converter in said gearing to transmit a high torque to the driven shaft, said transmission being so arranged that the torque decreases with the increase of speed of the driven shaft, including a retarding brake for retarding a portion of said gearing located between the driving shaft and said torque converter, said torque converter having a hydraulic impeller and a runner driven from the hydraulic impeller, and a hydraulic connection from the converter to operate the brake according to the speed of the converter.

2. A power diversion transmission comprising a driving shaft, a driven shaft driven thereby, a satellite gear having its axis secured to the driving shaft, a gear forming a driving connection between the satellite gear and the driven shaft, a diversion gearing in driving relationship between the satellite and the driven shaft, and a torque converter in said gearing to transmit a high torque to the driven shaft, said transmission being so arranged that the torque decreases with the increase of speed of the driven shaft, said torque converter including a retarding brake for retarding a portion of said gearing and a power converter having a hydraulic liquid operated impeller, a runner and a hydraulic connection from the converter to operate the brake, said runner having a centrifugal weight and a movable blade operated by the weight to restrict the hydraulic liquid flow with increasing runner speeds.

3. A torque converter comprising a driving shaft, a driven shaft driven thereby, a runner geared to drive the driven shaft, an impeller, gearing in driving relationship from the driving shaft to the impeller, said gearing including a power driven diversion gear and a satellite gear meshing with the power driven diversion gear and having its axis directly mounted on the driving shaft, an additional gear geared to be driven by the satellite gear, and a brake mechanism hydraulically controlled from said impeller to retard the said additional gear.

4. A torque converter comprising a driving shaft, a driven shaft driven thereby, a runner geared to drive the driven shaft, an impeller, gearing in driving relationship from the driving shaft to the impeller, said gearing including a power driven diversion gear, a counter-shaft having thereon gears connecting it to the power driven diversion gear, a satellite gear meshing with the power driven diversion gear and having its axis directly mounted on the driving shaft, a floating gear geared to be driven by the power driven diversion gear through the counter-shaft gears, and a brake for retarding the floating gear.

5. A torque converter comprising a driving shaft, a driven shaft driven thereby, a runner geared to drive the driven shaft, an impeller, gearing in driving relationship from the driving shaft to the impeller, said gearing including a power driven diversion gear, a counter-shaft having thereon gears connecting it to the power driven diversion gear, a satellite gear meshing with the power driven diversion gear and having its axis directly mounted on the driving shaft, a floating gear geared to be driven by the power driven diversion gear through the counter-shaft gears, a brake hydraulically controlled from said impeller to retard the floating gear, a second counter-shaft having a gear driven from the power driven diversion gear and a free wheeling connection in the gearing between the second counter-shaft gear and the power driven diversion gear permitting the overrunning of the second counter-shaft with regard to the said gearing and the driving of the second counter-shaft from the floating gear through the gears on the first counter-shaft when the brake is applied.

6. A torque converter comprising a driving shaft, a driven shaft driven thereby, a power driven diversion gear associated with and driven from the driving shaft, a gear secured on the driven shaft, a counter-shaft having a hydraulic impeller thereon for driving the driven shaft gear, a runner driven by the hydraulic impeller and geared to the driven shaft gear, a free wheeling connection located between the runner and the driven shaft gear so as to drive the driven shaft gear but permit the driven shaft to overrun the runner, and gearing including a brake connected with the power driven diversion gear to operate the impeller of the torque converter so as to drive the counter-shaft according to the position of the brake.

OLIVER W. ROOSEVELT.

REFERENCES CITED

The following references are of record in the file of this patent:

UNITED STATES PATENTS

| Number | Name | Date |
|---|---|---|
| 1,077,454 | Cooke | Nov. 4, 1913 |
| 1,627,294 | Nydquist | May 3, 1927 |
| 1,822,555 | Weiss | Sept. 8, 1931 |
| 1,900,120 | Lysholm | Mar. 7, 1933 |
| 1,960,705 | Kochling | May 29, 1934 |
| 2,021,526 | Stock | Nov. 19, 1935 |
| 2,135,282 | Fottinger | Nov. 1, 1938 |
| 2,181,118 | Burner | Nov. 28, 1939 |
| 2,309,912 | LaZaga | Feb. 2, 1943 |
| 2,365,879 | Jandasek | Dec. 26, 1944 |
| 2,378,085 | Jandasek | June 12, 1945 |
| 2,383,981 | Lysholm | Sept. 4, 1945 |